United States Patent Office 3,567,580
Patented Mar. 2, 1971

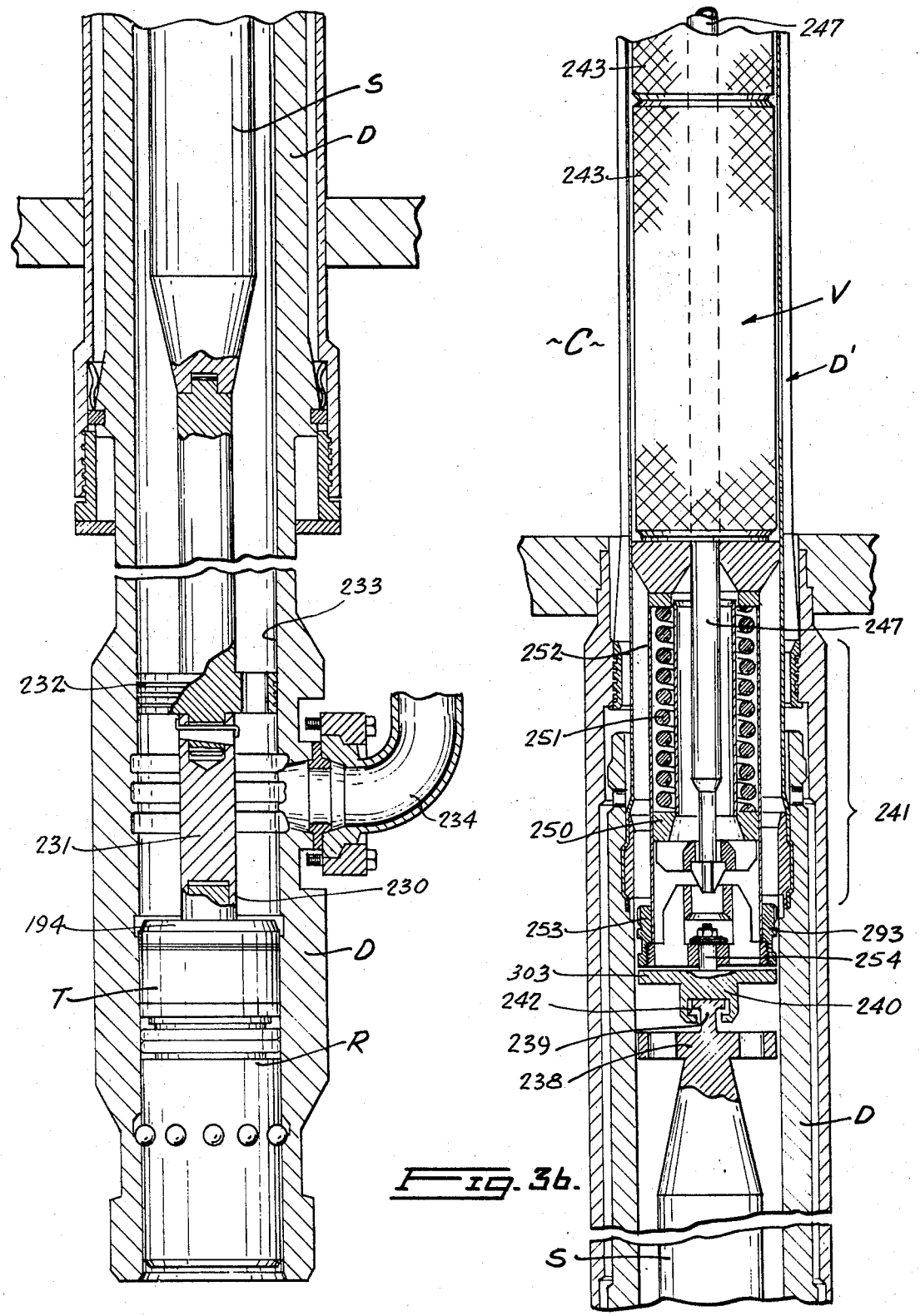

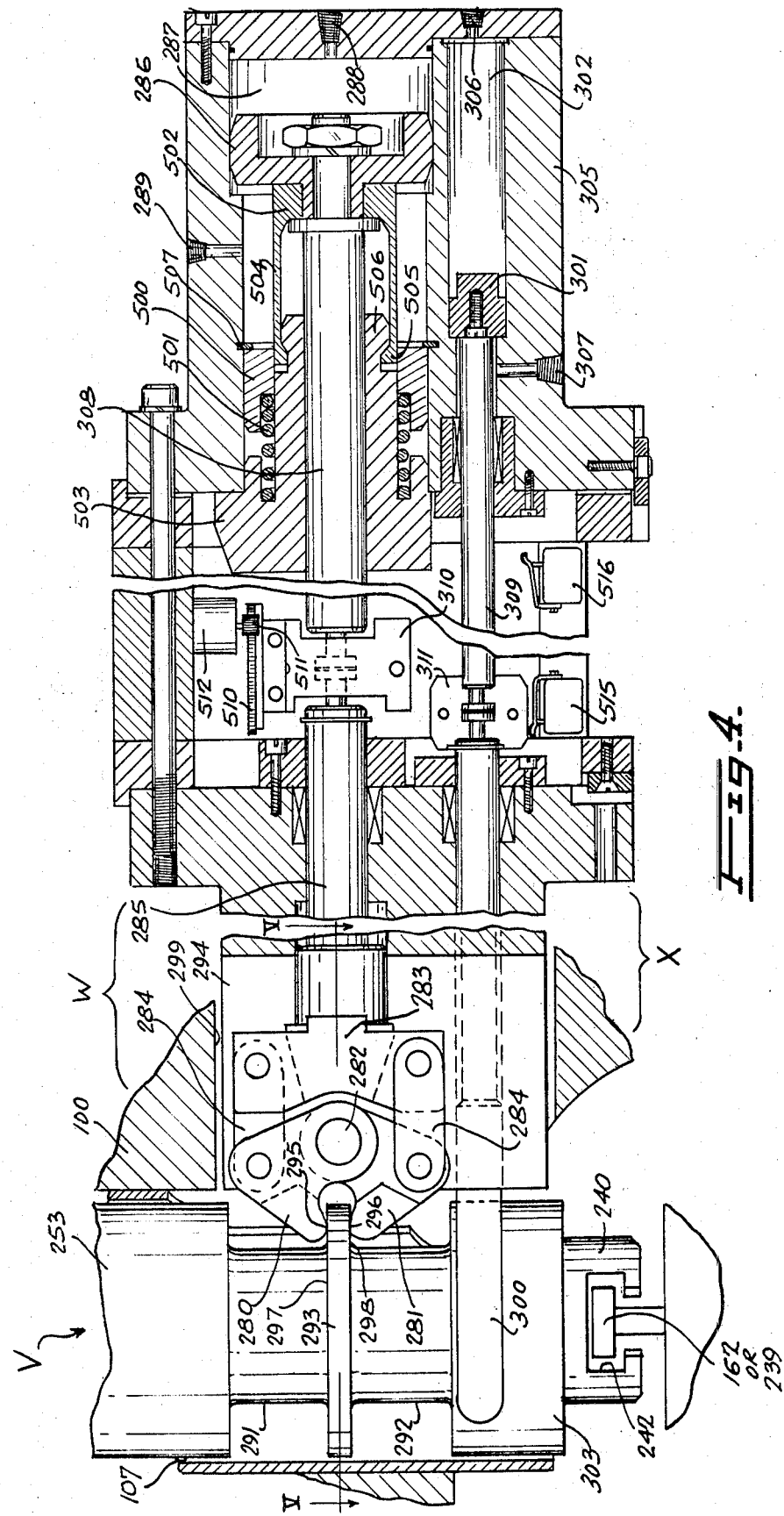

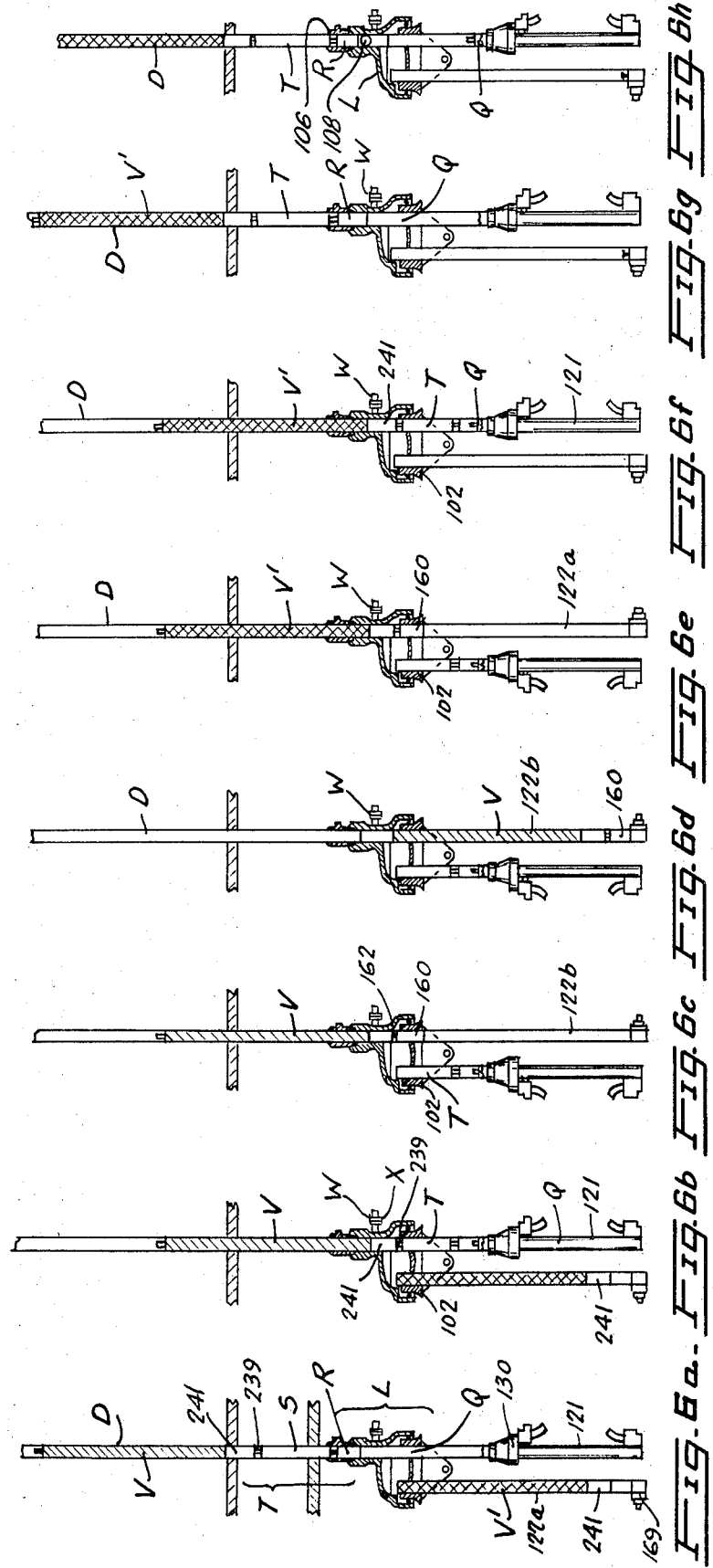

3,567,580
NUCLEAR REACTOR INSTALLATION
Roy K. Nakagawa and Peter Hubler, Toronto, Ontario, and Peter Isaac, Cooksville, Ontario, Canada, assignors to Atomic Energy of Canada Limited, Ottawa, Ontario, Canada
Filed Apr. 15, 1968, Ser. No. 721,410
Int. Cl. G21c *19/24*
U.S. Cl. 176—30                           11 Claims

ABSTRACT OF THE DISCLOSURE

Each fuel aggregate used for fuelling the reactor is divided into two portions between which a coupling is provided. During the procedures of loading and unloading such fuel aggregate into and from a selected reactor channel by means of a fuelling machine, the coupling is disengaged and the two portions are handled separately and sequentially. Locking means are provided for defining a predetermined position of the portion in the fuelling machine head such that proper engagement and disengagement of the coupling will be insured. This locking means includes a disc-shaped flange formed on that portion of the fuel aggregate, which is first inserted into and last withdrawn from the channel, and stop means mounted in the fuelling machine for engaging the flange in a pincer-like manner.

---

Reference is made to copending U.S. applications Ser. Nos. 721,293, 721,294, 721,295, 721,358, 721,408, and 721,409 filed Apr. 15, 1968.

The present invention relates to a nuclear reactor installation comprising a reactor, preferably of the heavy water type, and a fuelling machine for loading and unloading fuel aggregates into and from fuel channels of the reactor.

The fuel aggregates which contains the required fissile material (e.g., uranium) have a typical length of about 30 feet including a plug assembly for closing the end of the fuel channel. If such a fuel aggregate were to be handled as a single unit, a fuelling machine, which includes not only a container for receiving the fuel aggregate but also a snout assembly for establishing connection with the selected fuel channel, as well as a mechanism for displacing the fuel aggregate into and from the channel, would be required to have an undesirably large length dimension. Such a fuelling machine would not only be in itself expensive and difficult to operate, but it would also require the reactor building to have correspondingly large overall dimensions. To reduce these dimensions, each fuel aggregate is divided into portions which are loaded and unloaded separately and sequentially and which have to be coupled together during the loading procedure and uncoupled during the unloading procedure.

In an installation employing a loading and unloading procedure of this kind there arises the problem that, at the instant during the unloading procedure in which the first portion of the fuel aggregate has been withdrawn into the fuelling machine and uncoupled from the remainder of the fuel aggregate, there is a danger that this remainder be pulled back into the fuel channel by hydraulic forces or at least that it may change its position within the fuel channel as a result of the pressure conditions existing therein. If this should happen the ram for extracting the remaining portion of the fuel aggregate may fail to engage this portion. Similarly, during the loading procedure, it is difficult to perform the motions of the separate portions of the fuel aggregate so accurately that coupling together of these portions will always take place in a reliable manner. During the condition in both the loading and unloading procedures, in which part of the fuel aggregate is in a fuel channel while another part of the same fuel aggregate is in the fuelling machine, any malfunction by reason of misalignment of the fuel aggregate portions would likely cause damage that would require a considerable amount of time to be repaired.

To overcome these problems, the nuclear reactor installation of the present invention comprises a reactor and a fuelling machine for loading and unloading elongated fuel aggregates into and from channels of said reactor,
a said fuel aggregate consisting of separable parts having coupling means therebetween,
said fuelling machine including
  means for supporting a first one of said parts, having means movable relatively to said supporting means for displacing said fuel aggregate along its longitudinal axis into and from a selected said channel, and
  means for interconnecting and disconnecting the coupling means disposed between said first part and the remainder of said fuel aggregate, said reactor installation further comprising means for temporarily locking said remainder at a location fixed relatively to said interconnecting and disconnecting means.

In a preferred embodiment of this invention the locking means comprises two abutment surfaces disposed on the remainder of the fuel aggregate and extending substantially transversely to the longitudinal axis of the fuel aggregate to face in opposite directions to each other, the locking means further including stop means having two stop surfaces for engaging the abutment surfaces in a pincerlike manner. A locking mechanism of this construction serves not only to prevent the remainder of the fuel aggregate from changing its position within the fuel channel when uncoupled from the first portion of the aggregate, but also to insure that the entire aggregate assumes a predetermined location in the fuelling machine head, so that disengagement, and similarly engagement, of the coupling means between the two portions of the fuel aggregate can be performed safely and reliably.

Further features of the present invention will appear from the following specific description which is provided by way of example only.

In the accompanying drawings:

FIG. 3a shows the lower portion of a reactor fuel channel with an entire closure plug therein;

FIG. 3b shows an intermediate portion of this reactor fuel channel with further parts of the plug and a part of a fuel string;

FIG. 4 is a partially cutaway enlarged view of a locking mechanism being a fragment of FIG. 2, but with a part of the closure plug shown in place;

FIG. 6 consists of a series of small scale diagrammatic views *a* to *h* demonstrating a sequence of steps in a fuel unloading and reloading operation.

OVERALL ARRANGEMENT OF FUELLING MACHINE

Figure 1:
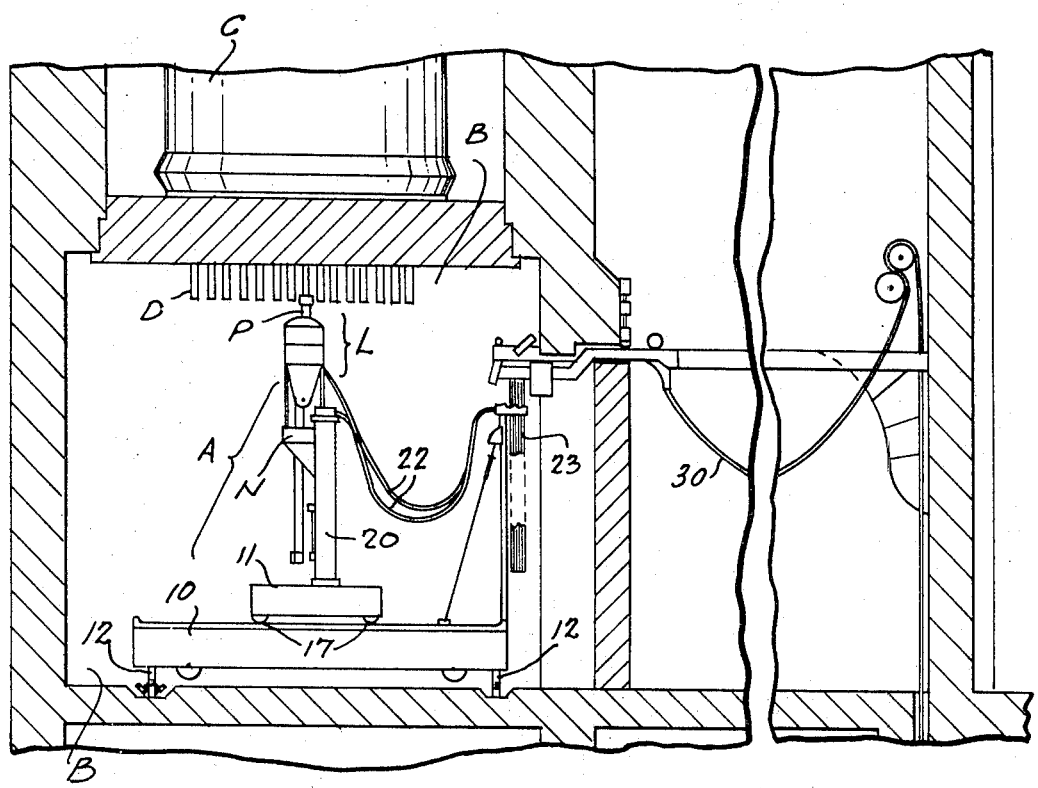
FIG. 1 is a cutaway elevation view of a fuelling machine associated with a nuclear reactor.

FIG. 1 illustrates the overall arrangement of a fuelling machine A located in a vault B beneath a nuclear reactor vessel C that has a plurality of fuel channels D that are required to be kept supplied with strings of nuclear fuel. The fuelling machine A comprises a main carriage 10 along which a trolley 11 can travel. The carriage 10 is provided with four wheels 12 for travel along the fuelling vault B in a first direction, and the trolley 11 has four wheels 17 for travel along the main carriage 10 in a second direction perpendicular to the first direction. Mounted on the trolley 11 are two upright columns 20 along which a support member N is slidable in a vertical direction. A fuelling machine head L having a snout subassembly P is connected to the support member N so as to be rotatable about a horizontal axis.

To couple the snout subassembly P to any one of the fuel channels D, the carriage 10 and the trolley 11 are moved to the appropriate location and then the machine head L is shifted upwardly to a position similar to that shown in FIG. 1.

The required fuel supply tubes (not shown) leading from the outside into the fuelling vault B may be disposed either in a vertical or a horizontal direction. In the latter case, coupling of the snout subassembly P to such supply tubes is performed by rotating the machine head L about 90° about its horizontal axis, shifting the head to the appropriate height and moving the trolley 11 and the carriage 10 to the appropriate location.

To carry out the required movements, the wheels 12 and 17, the support member N, and the machine head L are driven by hydraulic motors (not shown) in a conventional manner. Cables 22, 23, 30 for supplying the fuelling machine with hydraulic pressure connect the support member N with a source disposed outside the fuelling vault B.

GENERAL STRUCTURE OF THE FUELLING MACHINE HEAD

Figure 2:
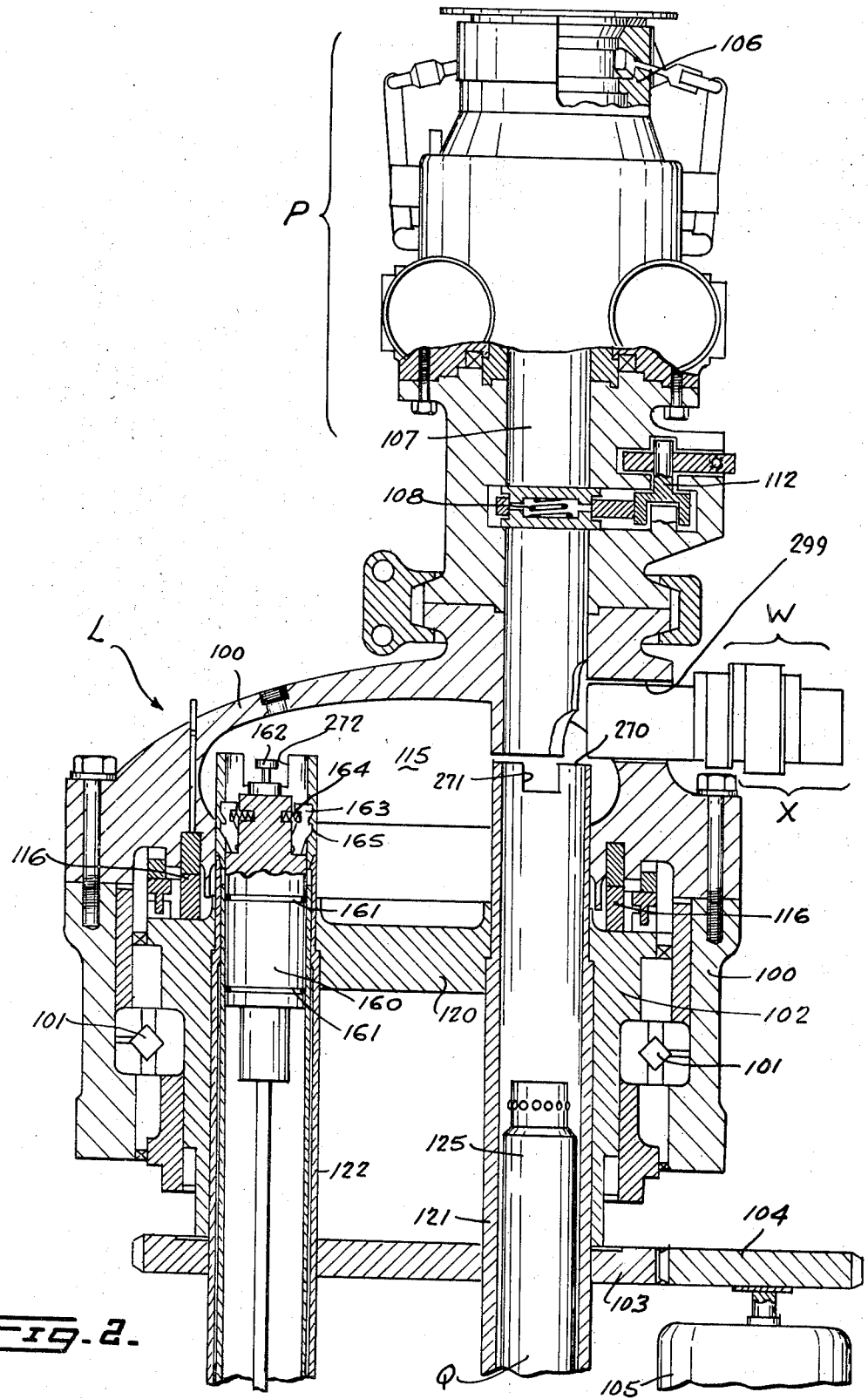
FIG. 2 is a section showing the upper portion of the head of the machine of FIG. 1.

Details of the structure of the fuelling machine head L are shown in FIG. 2. The head consists of a main housing 100 that is connected to the support member N (not shown in FIG. 2) and contains a bearing assembly 101 by means of which a turret 102 is rotatably mounted in the machine head. The turret 102 carries a large toothed wheel 103 meshing with a toothed wheel 104 on the shaft of a motor 105, this motor being employed for indexing the turret 102 between various positions relative to the main casing 100, in the manner and for the purposes described below.

Rigidly connected to the housing 100 is the snout subassembly P including at its end a locking mechanism 106 for engaging the end of a reactor fuel channel D in the manner shown on the small scale in FIG. 1. The snout subassembly P also serves to define a channel 107 extending from the locking mechanism 106 to the turret 102, a shut-off valve 108 being located in such channel 107, the valve 108 being actuated by a mechanism 112. The valve 108 is shown in FIG. 2 in its closed position.

During operation, a space 115 defined within the turret 102 will be in communication via the channel 107 with the interior of a reactor fuel channel D under high pressure. It is therefore necessary to provide the interior of the turret 102 with means for sealing such pressure against the exterior, this being accomplished by means of a controlled leakage hydrostatic seal 116.

The turret 102 comprises a head portion 120 from which four barrels 121 and 122 extend downwardly, such barrels constituting a pair of oppositely disposed ram barrels 121 and a pair of oppositely disposed fuel barrels 122 arranged intermediate the ram barrels.

In each of the fuel barrels 122 there is slidably mounted a free piston 160 having seals 161 encircling its perimeter. At its forward end the piston 160 has a projecting pin 162 of T-shaped cross section and at an intermediate location it carries pivoted mechanical stops 163 that are urged radially outwardly by springs 164 into engagement with cavities 165 in the barrel 122. The stops 163 and cavities 165 are shaped to prevent the piston 160 moving upward from the position shown, while leaving it free to move downward.

The barrel 122 serves as a hydraulic cylinder, and conventional valve means 169 (FIG. 6a) are provided to control the liquid pressure in the barrel 122 thereby moving the piston 160 upwards and downwards. The front end of each fuel barrel 122 is provided with a pair of slots 272.

Each ram barrel 121 houses a ram mechanism Q comprising a ram head 125 movable upwards and downwards by means of a hydraulic drive unit 130 (FIG. 6a). The front end 270 of each ram barrel 121 is provided with a pair of slots 271. All slots 271, 272 in the barrels 121, 122 are disposed on a circle concentric to the axis of rotation of the turret 102.

The snout subassembly P terminates at its upper end in the locking mechanism 106, the structural details of which are described in Canadian Hummel Pat. No. 738,540 issued July 12, 1966 and in the corresponding U.S. Pat. No. 3,169,909 issued Feb. 16, 1965. After this locking mechanism 106 has engaged one of the fuel channels D, as shown in FIG. 1, the ram head 125 is shifted upwards and coupled to a plug assembly T (FIG. 3a) connected to the lower end of an associated fuel string V (FIG. 3b).

Close to the lower end of the channel 107, the housing 100 is provided with a lateral bore 299 for mounting a combined fuel string stop and alignment unit designated with the letters W and X, which unit is described in more detail below.

GENERAL STRUCTURE OF FUEL STRING WITH CLOSURE PLUG

FIGS. 3a and 3b show the lower portion of a fuel channel D with the plug assembly T including a closure plug R and a shield S, which serves to reduce neutron loss from the reactor, as well as the fuel string V in normal operating position, and also show the manner in which the lower end 230 of a rod 231 is fixed to the upper member 194 of the plug R. Rod 231 forms the lower extremity of the shield plug S which includes an orifice plate 232 the periphery of which is adapted to slide along the inner wall 233 of the reactor fuel channel D. A pipe 234 represents an entrance for coolant water into the channel D and along the channel into the reactor vessel proper. The upper end of the shield plug S terminates in a guide plate 238 and a T-pin 239 that engages a corresponding T-slot 242 in an end member 240 of a tensioning mechanism 241 mounted on the end of the fuel string V located in the active portion here designated D' of the reactor fuel channel D, namely the portion that extends through the reactor vessel C itself.

The fuel string V consists of a series of separate fuel bundles 243, each bundle consisting of a series of parallel arranged clad fuel elements rigidly joined together into a string by means of a tube 247. The tube 247 extends along the entire fuel string V, having its lower end connected to an end member 250 in the tensioning mechanism 241. The member 250 is urged downwardly by the lower end of a spring 251, the upper end of which acts against the casing 252 of the tensioning mechanism 241. The casing 252 is connected through an orifice plate 253 and a bolt 254 to the end member 240. The spring 251 thus holds the individual fuel bundles 243 of the string V tightly pressed together longitudinally as well as connected to the end member 240, which in turn is coupled to the plug S, so that when the closure plug R is withdrawn from the fuel channel D the entire plug assembly R and S and the entire fuel string V follow. The manner in which these parts are thus withdrawn into the fuelling machine is described below.

STOP MECHANISM

Figure 5:
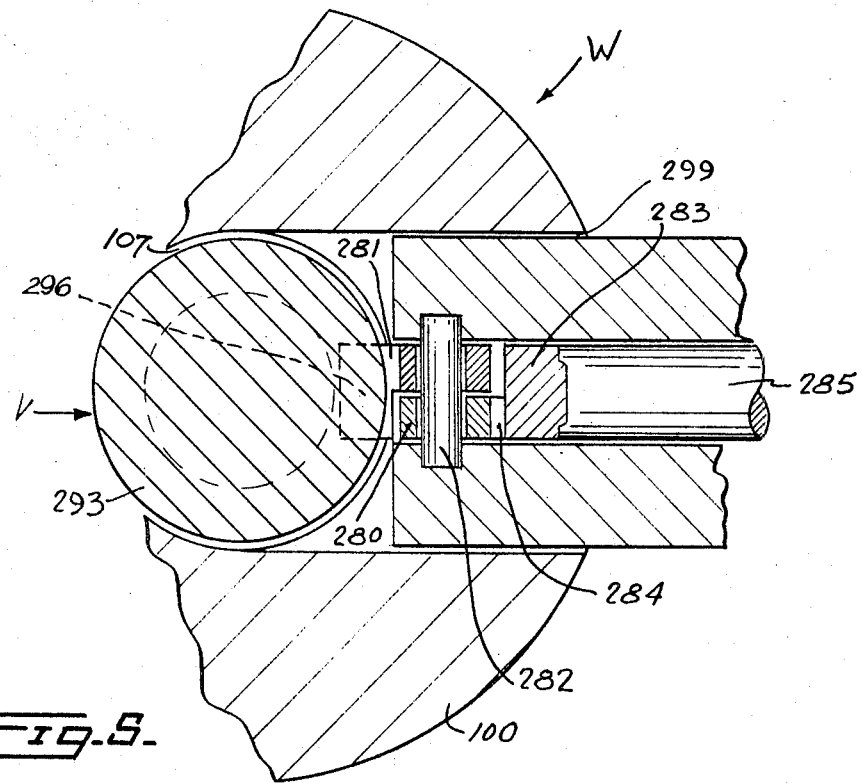
FIG. 5 is a section on the line V—V in FIG. 4.

FIGS. 4 and 5 show a stop mechanism W that is mounted in the bore 299 of the main housing 100 of the machine head L as indicated in FIG. 2. This mechanism comprises a pair of detents 280 and 281 mounted on a pin 282 to be pivoted in opposite directions by sliding movement of a yoke 283 the ends of which are connected by links 284 to the inner ends of respective detents 280, 281. The center of the yoke 283 is connected by rods 285, 308 to a piston 286 reciprocable in a cylinder 287, to either side of which a differential pressure can be applied by passages 288 and 289, respectively. The outer ends of the detents 280, 281 are thickened to form a pair of stop surfaces 295, 296 facing each other. In FIG. 4, the stop mechanism W is shown in its operative position in which the detents 280, 281 engage in a pincerlike manner a disc 293 formed on the orifice plate 253 of the fuel string V by two adjacent annular recesses 291, 292, the stop surface 295 bearing against the upper surface 297 of the disc 293 and the stop surface 296 bearing against the lower surface 298 of the disc 293. As can be readily visualised, movement of the piston 286 to the right will rotate each of the detents 280, 281 in a direction to withdraw its stop surfaces 295, 296 back into the bore 299 in the housing 100 and thus out of contact with any elements in the channel 107.

The piston 286 is provided with a safety latch comprising an annular piston 500 surrounding a fixed member 503, a compression spring 501 disposed to urge the annular piston 500 away from the fixed member 503 against a retaining ring 507, and a spring collet 502 connected at its one end to the piston 286. The other end of the spring collet 502 is slotted to form resilient fingers 504 which have at their free ends inwardly projecting noses 505 adapted to engage an outwardly projecting shoulder 506 of the fixed member 503.

When the piston 286 is displaced to the left in FIG. 4 by applying a differential pressure through the passage 288, the resilient fingers 504 of the spring collet 502 will push the annular piston 500 against the action of the compression spring 501 until the noses 505 have slid over the shoulder 506. The piston 500 is then advanced to lock the fingers 504 to the fixed member 503 and thereby to hold the piston 286 in its position so that the detents 280 and 281 continue to engage the disc 293 of the fuel string V even if the pressure fluid supply should fail.

In the normal retracting operation, the differential pressure entering through the passage 289 will first push the piston 500 against the spring 501. This frees the fingers 504 and permits them to slide over the shoulder 506 as the piston 286 is moved to the right in FIG. 4.

It will be appreciated that by means of this manner of mounting the detents 280, 281, whenever they are moved out into their operative positions, in the last part of the movement the two stop surfaces 295, 296 will be travelling towards each other in opposite directions along the channel 107 and will thus serve to locate the disc 293 accurately in the longitudinal direction, should the ram mechanism Q which has withdrawn the plug assembly and with it the fuel string not locate the disc 293 in exactly the correct longitudinal position required. The stop mechanism W thus also serves as a longitudinal location mechanism.

The two rods 285 and 308 are interconnected by a coupling 310 on which a rack 510 is mounted to extend in the direction of the rods 285, 308. The rack 510 meshes with a pinion 511 mounted on the shaft of a potentiometer 512 which serves to indicate three conditions of the stop mechanism:

(a) A fully retracted position in which the detents 280 and 281 are withdrawn from the channel 107 to allow free movement of a fuel aggregate through the channel 107;

(b) The centered position shown in FIG. 4 in which the detents 280, 281 engage the disc 293 of a fuel string V; and (c) An overriding position in which the detents 280 and 281 contact each other, which is possible only if there is no fuel string in the channel 107 due to improper operation of the fuelling machine.

Any intermediate position between those described above under (a) and (b) can be caused by a malfunction of the stop mechanism itself or by such an inexact position of the fuel string V in the channel 107 that the detents 280, 281 cannot enter the annular recesses 291, 292 but are stopped on hitting a portion of the outer cylindrical surface of the fuel string.

ALIGNMENT MECHANISM

Mounted together with the stop mechanism W is an alignment mechanism X which comprises essentially a slide member 300 controlled by a piston 301 and adapted to cooperate, when the slide member is moved out into the projecting location shown in FIG. 4, with a cam shaped profile 303 of the end member 240. Should the profile 303 not be oriented in the rotational position shown when the slide member 300 is moved out, it will be turned to this orientation thus aligning the slot 242 for movement in and out thereof of either the T-pin 239 on the end of the plug assembly or the T-pin 162 on the piston 160 upon indexing movement of the turret 102, FIG. 2.

The piston 301 is movable in a cylinder 302 provided in the same member 305 and adjacent to the cylinder 287, in either direction depending on whether a higher differential pressure is applied to the cylinder 302 by a passage 306 or a passage 307.

The slide member 300 is connected to the piston rod 309 by a coupling 311 which additionally serves as a cam member for actuating a position switch 515 in the fully extended position shown in FIG. 4 or a position switch 516 in the fully retracted position of the piston 301.

A space 294 of the combined mechanism is in communication with the space 115 within the fuelling machine head L and hence operates in water. The remaining portion of the mechanism including the pistons 286 and 301 and associated piston rods 308 and 309 forms a unit operating in oil hydraulics, which can be detached from the portion enclosing the space 294 without draining water from the fuelling machine head L by releasing the couplings 310 and 311.

FUEL UNLOADING AND RELOADING PROCEDURE

FIG. 6 shows in a series of small scale views designated $a$ to $h$, the principal steps in a fuel unloading and reloading operation. FIG. 6a shows a reactor fuel channel D containing the plug assembly T which is connected to the tensioning mechanism 241 on the end of a fuel string V by means of the T-pin 239. It is assumed that the fuel string V consists of at least partly spent fuel and is to be removed from channel D and replaced by a fresh fuel string V' which is stored in a first one of the two fuel barrels 122 (here designated 122a) of the fuelling machine head L. One of the ram barrels 121 is aligned with the channel D and the ram mechanism Q has been advanced to release the closure plug R.

The ram mechanism Q is now fully withdrawn (FIG. 6b) which action has the effect of drawing the plug assembly T down into the barrel 121 in such a manner as to align its T-pin 239 with the extreme end 270 (FIG. 2) of the barrel 121. In the manner described the stop mechanism W positions the fuel string V along its longitudinal axis and then the mechanism X in the machine head L ensures alignment of the open sides of the T-slot of the tensioning mechanism 241 at the end of the fuel string V with the circumferential direction of movement of the turret 102. At this time, the stop mechanism W also locks the fuel string temporarily in this position. The circumferential alignment together with the fact that the fuel string cannot at this time move longitudinally permits the turret 102 to be indexed through 90°, which action is now carried out (FIG. 6c), with the effect that the T-pin 239 on the upper end of the plug assembly T is moved sideways out of its former engagement with the T-slot and is replaced by the T-pin 162 on the end of the piston 160 in the other of the fuel barrels 122b, which second fuel barrel is empty at this time. During this rotation, the end member 240 of the fuel string V containing the T-slot 242 passes through the respective one of the slots 271 at the end 270 of the ram barrel 121 as well as through one of the slots 272 at the front end of the fuel barrel 122*b* (FIG. 2).

The next step (FIG. 6*d*) is to return the stop mechanism W into an inactive position, to extract the fuel string V from the channel D and draw it down into the fuel barrel 122*b*, and this effect is achieved by a gradual reduction of liquid pressure in the barrel 122*b* behind the piston 160.

The turret 102 is now indexed around by 180° to bring the fuel barrel 122*a* containing the fresh fuel string V' into register with the channel D, whereupon sufficient pressure is applied behind the piston 160 in the barrel 122*a* to force it to move upwardly against the liquid pressure in the channel itself, thus moving the fuel string V' into the channel D (FIG. 6*e*). With the new string locked in this position by reactuation of the stop mechanism W, the turret 102 is now again indexed through 90° to return the ram barrel 121 to alignment with the channel D (FIG. 6*f*), and thus connect the plug assembly T stored in the barrel 121 to the tensioning mechanism 241 of the new fuel string V'. The stop mechanism W is again released and then the ram mechanism Q is advanced to reinsert the plug assembly T with the fuel string V' attached thereto into the channel D (FIG. 6*g*).

Finally, the closure plug R is replaced in the end of the channel D and the ram mechanism is retracted (FIG. 6*h*).

The liquid pressure inside the machine head L is then reduced, the shut-off valve 108 closed and locking mechanism 106 of the machine head L released in order to disengage the fuelling machine head from the particular channel D that has been refuelled.

We claim:

1. A nuclear reactor installation, comprising a reactor and a fuelling machine for loading and unloading elongated fuel aggregates into and from channels of said reactor,
   (a) a said fuel aggregate consisting of separable portions having coupling means therebetween;
   (b) said fuelling machine including
      (i) means for supporting a first one of said portions, having means movable relatively to said supporting means for displacing said fuel aggregate along its longitudinal axis into and from a selected said channel, and
      (ii) means for interconnecting and disconnecting the coupling means disposed between said first portion and the remainder of said fuel aggregate;
   (c) said reactor installation further comprising means for temporarily locking said remainder at a location fixed relatively to said interconnecting and disconnecting means.

2. An installation as in claim 1, wherein said locking means comprises at least one abutment surface disposed on said remainder of said fuel aggregate and extending substantially perpendicularly to said longitudinal axis, stop means for engaging said abutment surface, and means for moving said stop means into and out of engagement with said abutment surface.

3. An installation as in claim 2, wherein said locking means comprises two abutment surfaces disposed on said remainder of said fuel aggregate, extending substantially perpendicularly to said longitudinal axis and facing in opposite directions to each other, and wherein said stop means comprises two stop surfaces for engaging said abutment surfaces on said remainder.

4. An installation as in claim 2, wherein said stop means and said moving means are located in said fuelling machine.

5. An installation as in claim 4, wherein said stop means and said moving means form a unit detachable from said fuelling machine.

6. An installation as in claim 2, wherein said moving means comprises a hydraulic cylinder and piston arrangement.

7. An installation as in claim 6, wherein said cylinder and piston arrangement comprises
   (a) a cylinder having two passages for admitting hydraulic fluid;
   (b) a main piston operably connected to said stop means and reciprocably mounted in said cylinder between said passages; and
   (c) a safety latch including an auxiliary piston reciprocably mounted in said cylinder and a spring urging said auxiliary piston to lock said main piston in an engaging position in which said stop means engages said abutment surface;
   (d) one of said passages being disposed between said auxiliary piston and said main piston to allow the fluid admitted through said passage to move said auxiliary piston against the action of said spring and subsequently said main piston out of said engaging position.

8. An installation as in claim 2, further comprising means for indicating the position of said stop means.

9. An installation as in claim 8, wherein said indicating means comprises a potentiometer operably connected to said moving means.

10. An installation as in claim 1, wherein said locking means comprises
   (a) a disc formed on said remainder of said fuel aggregate by two adjacent circumferential recesses, said disc having two surfaces facing in opposite directions to each other along said longitudinal axis;
   (b) a pin mounted in said fuelling machine to extend perepndicular to said longitudinal axis, and first and second detents pivoted on said pin, a first stop surface disposed on said first detent for engaging one of said disc surfaces and a second stop surface disposed on said second detent for engaging the other one of said disc surfaces; and
   (c) means for simultaneously rotating said first and second detents in opposite senses to each other to cause pincerlike engagement between said first and second detents and said disc.

11. An installation as in claim 10 wherein said rotating means comprises a hydraulic cylinder mounted in said fuelling machine and a piston reciprocable in said cylinder and carrying at its free end two links articulated to said first and second detents.

References Cited

UNITED STATES PATENTS

| | | | |
|---|---|---|---|
| 3,157,579 | 11/1964 | Hummel | 176—30 |
| 3,300,389 | 1/1967 | Packman et al. | 176—32 |

CARL D. QUARFORTH, Primary Examiner

H. E. BEHREND, Assistant Examiner

U.S. Cl. X.R.

214—18